2 Sheets—Sheet 1.

W. McCONWAY, W. KELSO & F. J. CURTIS.

CAR COUPLING.

No. 11,546. Reissued June 2, 1896.

WITNESSES:

Chas. F. Miller.

D. E. Gaither.

INVENTORS

William McConway

William Kelso

Francis J. Curtis by Dawris & Wolcott Att'ys.

W. McCONWAY, W. KELSO & F. J. CURTIS.

CAR COUPLING.

No. 11,546. Reissued June 2, 1896.

WITNESSES:

Chas. F. Miller

D. E. Gaither

INVENTORS

William McConway

William Kelso

Frank J. Curtis by Damrich & Walcott Att'ys.

UNITED STATES PATENT OFFICE.

WILLIAM McCONWAY AND WILLIAM KELSO, OF PITTSBURG, AND FRANK J. CURTIS, OF BEN AVON, PENNSYLVANIA, ASSIGNORS TO THE McCONWAY & TORLEY COMPANY, OF PITTSBURG, PENNSYLVANIA.

CAR-COUPLING.

SPECIFICATION forming part of Reissued Letters Patent No. 11,546, dated June 2, 1896.

Original No. 548,783, dated September 24, 1895. Application filed February 17, 1896. Serial No. 579,675.

*To all whom it may concern:*

Be it known that we, WILLIAM McCONWAY and WILLIAM KELSO, residing at Pittsburg, and FRANK J. CURTIS, residing at Ben Avon, in the county of Allegheny and State of Pennsylvania, citizens of the United States, have invented or discovered certain new and useful Improvements in Car-Couplers, of which improvements the following is a specification.

The invention described herein relates to certain improvements in mechanism for so supporting the locking block or pin in unlocking position as to be capable of being shifted by the swinging knuckle when turned to open or closed position, thereby permitting of the automatic movement of the locking-block.

The invention has for its object a construction and arrangement of such mechanism as will permit of a certain range of independent movement of either the supporting device or locking block or pin; and it is a further object of the invention to so construct such supporting mechanism as to be operative when shifted to raise the locking block or pin to unlocking position.

Figure 1:
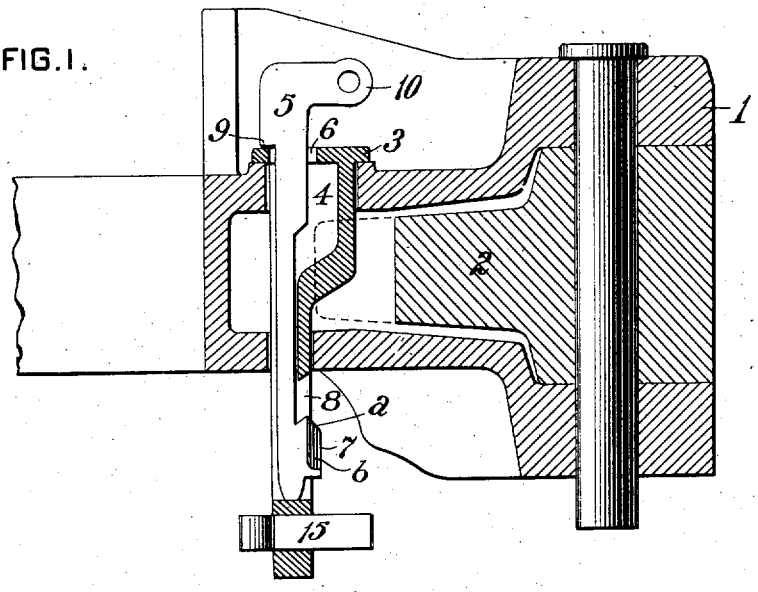
Figure 2:
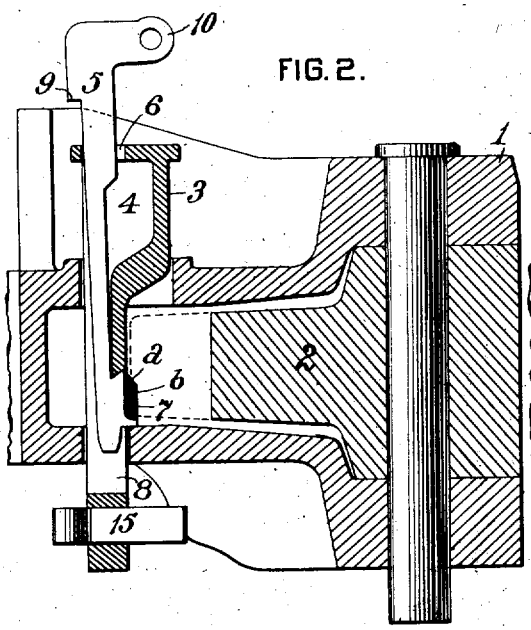
Figure 3:
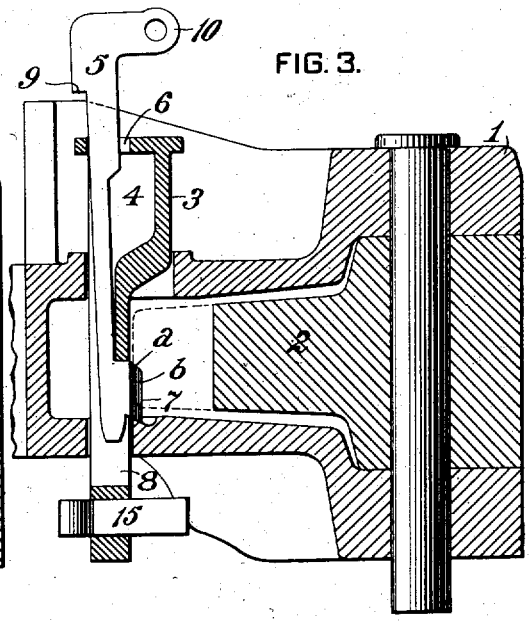
Figure 4:
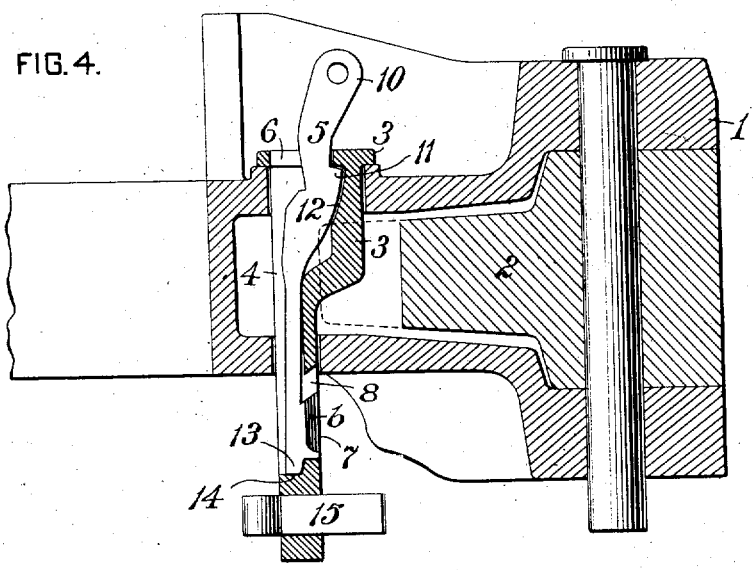
Figure 5:
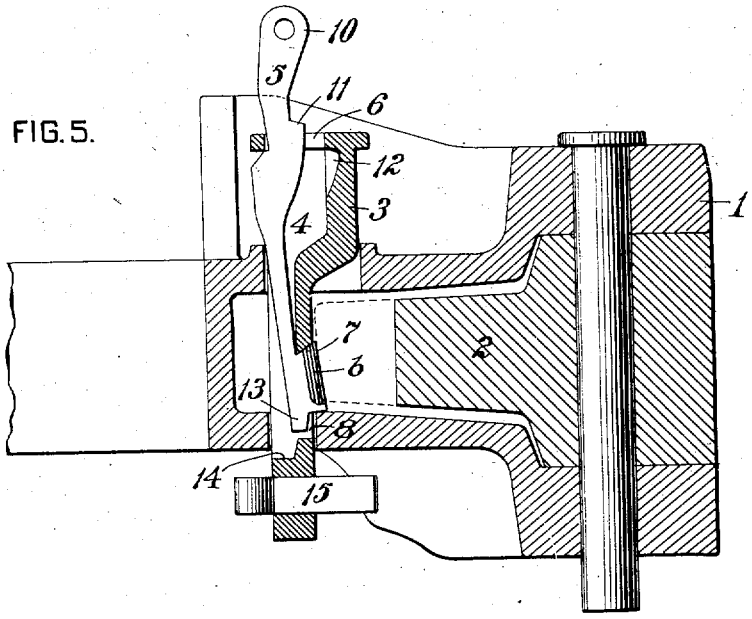

In the accompanying drawings, forming a part of this specification, Figure 1 is a sectional elevation of a coupler having the improvement applied thereto, the locking-block and the supporting device being shown down. Fig. 2 is a similar view, the locking block or pin being supported in unlocking position. Fig. 3 is a view similar to Fig. 2, illustrating a modification in the lock for holding the supporting device in operative position. Figs. 4 and 5 are sectional elevations similar to Figs. 1 and 2, illustrating certain modifications in the construction of the supporting device.

In the practice of the invention the coupler, which is of the Janney or swinging-hook type, has its head 1 and swinging hook or knuckle 2 constructed in the usual or any suitable manner. The locking block or pin 3, which is of the usual or any suitable construction, is provided with a longitudinal recess 4 for the reception of the stem 5, which projects through a slot 6 in the head of the block or pin and is provided at or near its lower end with a catch adapted to engage a portion of the coupler-head and support the block or pin 3 in unlocking position. In the construction shown in Figs. 1, 2, 3, 4, and 5 this catch is made in the form of a lug or ear 7, projecting from one side of the stem 5. Normally this ear or lug lies within a slot 8, formed through the locking-pin at the lower end of the recess 4, but will project beyond the face of the block or pin when the stem is shifted, as hereinafter described. The stem is supported in normal position—*i. e.*, with its ear or lug wholly within the slot 8—by a shoulder 9 near its upper end resting on the head of the locking block or pin, as shown in Fig. 1. On the part of the stem above the locking block or pin and on the same side as the ear or lug 7 is formed an arm 10, to which is attached the clevis or chain or other device employed for raising the locking block or pin.

As shown in Figs. 1, 2, and 3, the slot 8 is made of such a length as to permit of a movement of the stem independent of the locking block or pin. In practice this slot is preferably made approximately twice as long as the ear or lug 7, which projects into the slot, and the slot is so located in the locking-pin and the ear or lug on the stem 5 that when the ear or lug is in its normal position at the lower end of the slot the upward movement of the locking-pin effected by the tail of the knuckle will not be sufficient to bring the lower end of the ear or lug above the lower wall of the coupler-head. It results from this construction that when the locking block or pin is lifted by the tail of the knuckle when swung to closed position the stem will not be raised sufficiently far to permit of the lower end of ear or lug passing out of the slot 8; or, in other words, the pin or block can be raised to unlocking position by the tail of the knuckle without bringing the ear or lug on the stem into operative position. When the stem is raised by the chain attached to the arm 10, the lower end of the stem will be shifted laterally, so as to cause the ear or lug to project out of the slot 8, and as the stem moves up the upper end of the ear or lug will strike against the end of the slot 8, so that during its further upward movement the stem will carry the locking block or pin with it. As the opening in the bottom of the coupler-head is made only enough larger than the pin to permit of the free movement of the latter, provision is made for pushing the ear or lug back into its slot 8 sufficiently to permit of the movement of the ear or lug into the coupler. This temporary inward movement may be effected in any suitable manner—as, for example, by forming on the upper end of the ear or lug an incline or bevel *a*, which, by striking against the edge of the opening in the bottom of the coupler-head, will push the ear or lug back into the slot; but by reason of the direction of pull of the lifting-chain on the stem the latter will be shifted, so as to cause the ear or lug to project out of the slot again as soon as it has been raised to such a height that its lower end has passed out of the opening in the bottom of the coupler-head. The lower end of the projecting ear or lug will now rest upon the bottom of the coupler-head and the locking block or pin, which has reached unlocking position, will rest upon the upper end of the ear or lug.

In order to prevent the accidental displacement of the ear or lug, a notch is formed in its upper end back of the incline *a* for the reception of the V-shaped edge of the wall at the upper end of the slot 8, as shown in Figs. 1 and 2, or a notch may be formed in the lower end of the ear or lug for the reception of a shoulder on the bottom of the coupler-head, as shown in Fig. 3.

In the construction shown in Figs. 4 and 5 the stem 5 is provided with a shoulder 11, on the same side as the ear or lug 7, for engagement in a recess 12 in the locking block or pin, and the slot 6 in the head of the latter is elongated, so as to permit of a sufficient backward movement of the stem 8 to disengage the shoulder 11 from the recess 12, as shown in Fig. 5. In this construction the stem is provided below the ear or lug 7 with a projection 13, adapted to engage a shoulder 14 on the locking block or pin and prevent any lateral movement of the stem and its ear or lug until the shoulder 11 has been withdrawn from the recess 12 and the stem moved along the pin a short distance. In this construction the locking block or pin is carried up by the shoulder 11 until the cotter-pin or other stop 15 at the lower end of the block strikes against the coupler-head and checks a further movement of the block or pin. The continued pull on the stem will withdraw the shoulder 11 from the recess 12, thereby permitting such upward movement of the stem as will raise the projection 13 clear of the shoulder 14, when the lower end of the stem is shifted laterally by reason of the direction of pull on its upper end. This lateral movement of the lower end of the stem moves the ear or lug 7 out of its slot 8 over the bottom of the coupler-head, as shown in Fig. 5. The engagement of the projection 13 with the shoulder 14 will prevent any outward movement of the ear or lug, except when the stem is unlocked from the locking block or pin and moved independently thereof by the lifting-chain, in the manner described. Hence as long as the stem is raised by the locking-block it will not be held in unlocking position. The front edge of the catch, which, when in operative position, projects in the path of movement of the tail of the knuckle, is beveled, as at *b*, so that the tail will pass by the catch, and in passing by will push the catch back into the slot 8, thereby permitting the locking block or pin to drop to locking position.

It is characteristic of this improvement that when the locking block or pin is lifted by the tail of the knuckle when shifted to closed position the catch will not be brought to operative position; but when the locking block or pin is raised by the stem 5 the latter is given a movement independent of the block or pin sufficient to bring the catch to such a position that it will be free to be shifted to operative position as soon as it has passed through the opening in the bottom of the coupler-head.

We claim herein as our invention—

1. In a car-coupler having a swinging hook locked and unlocked through the tailpiece, a vertically and longitudinally movable locking block or pin grooved longitudinally for the reception of an operating-stem and recessed for the projection therethrough of a catch made on the stem, in combination with a stem and catch movable therewith through the distance to which the locking block or pin is raised when lifted by the tailpiece of the knuckle, and also movable downward to locking position without engaging with any fixed part of the coupling mechanism, substantially as described.

2. In a car-coupler having a swinging hook locked and unlocked through the tailpiece, a vertically and longitudinally movable locking block or pin grooved longitudinally for the reception of an operating-stem and recessed for the projection therethrough of a catch made on the stem, in combination with a stem and catch in which combination the locking-block may move freely a distance sufficient for the independent lifting of the locking-block by the tailpiece of the knuckle, and said stem may have an oscillatory movement whereby the catch will be projected into the path of the swinging tailpiece and engage some fixed portion of the draw-head, substantially as set forth.

3. In a car-coupler having a swinging hook, locked and unlocked through the tailpiece, a vertically and longitudinally movable locking block or pin adapted to lock the hook in its closed position and to be raised by the tailpiece of the knuckle when the latter is shifted from open to closed position, in combination with a supporting-catch applied thereto, and movable with the locking block or pin when the latter is lifted or raised by the closing movement of the tailpiece, and in such manner as not to interfere with the return movement of the locking block or pin, and means other than the locking block or pin for lifting the catch, which is adapted, when so lifted, to be shifted into engagement with some fixed part of the coupler so as then to support the locking block or pin in unlocking position, substantially as set forth.

4. The combination of a coupler-head and pivoted knuckle or swinging hook, a block or pin for locking the hook in a closed position, a stem mounted on the block or pin and adapted to raise the latter to unlocking position, a catch adapted to be shifted by the stem into engagement with the pin and some portion of the coupler, thereby supporting the block or pin in unlocking position, and a lock for holding the catch as against accidental displacement from such operative position, substantially as set forth.

5. The combination of a slotted locking-block, a stem having a limited range of movement therein, and a catch projecting from the stem through a slot or recess in the locking block or pin, and constructed to have a V-shaped engagement with a portion of the coupler with reference to holding the catch in unlocking position as against accidental displacement, substantially as set forth.

6. The combination of a coupler-head, a pivoted knuckle, a block or pin adapted to lock the hook in its closed position and to be raised by the tail of the knuckle when moving to closed position, a pin-supporting catch movable with and independent of the locking block or pin, said catch being inoperative when lifted by the locking-pin, but operative when employed for lifting the block or pin to unlocking position, substantially as set forth.

In testimony whereof we have hereunto set our hands.

WILLIAM McCONWAY.
WILLIAM KELSO.
FRANK J. CURTIS.

Witnesses:
JOSEPH STANTON,
F. D. ECKER.